March 21, 1961 P. R. GRAY 2,976,368
INCOMING TRUNK CIRCUIT FOR IN-DIALING SERVICE
Filed Nov. 17, 1958
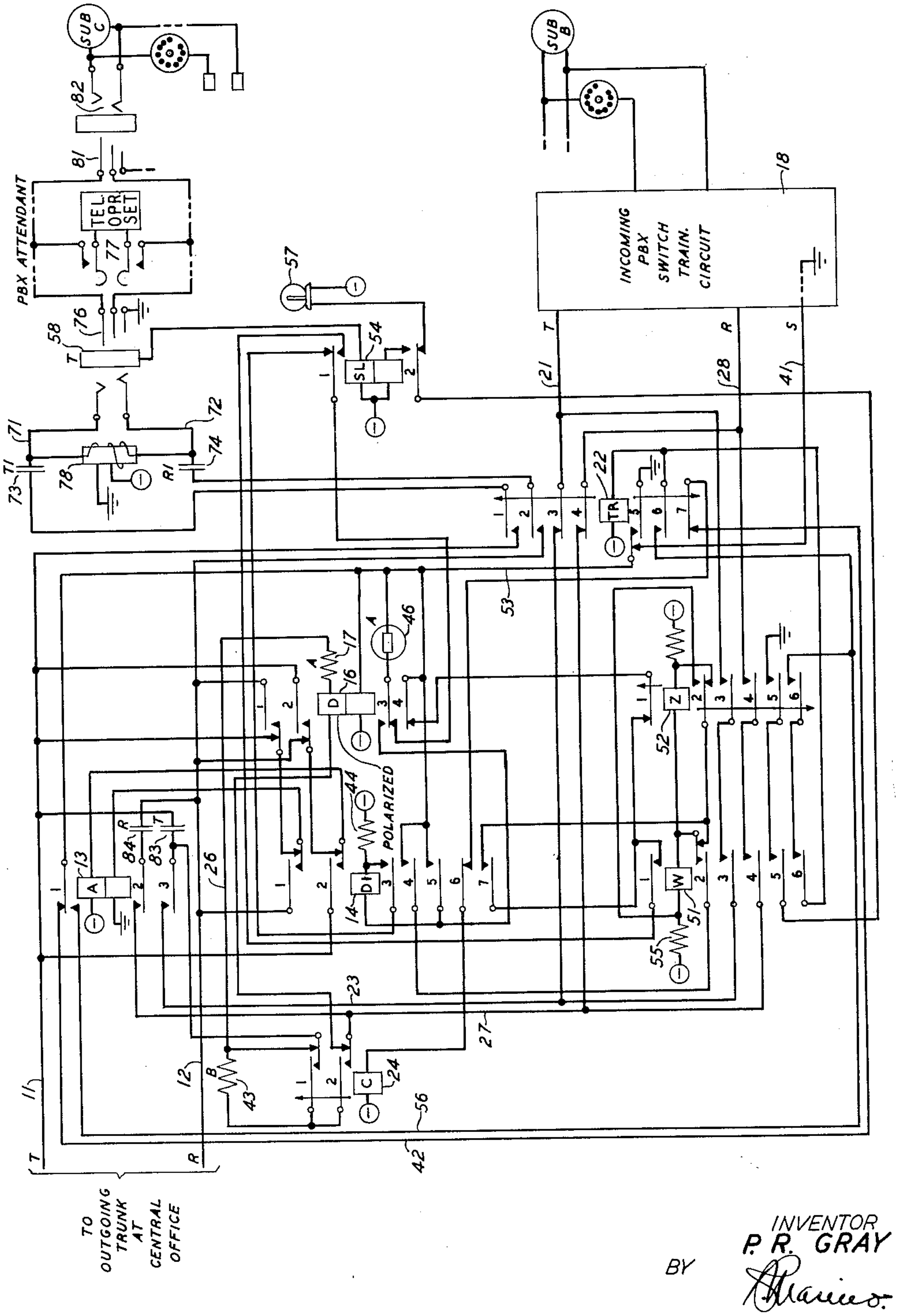
INVENTOR
P. R. GRAY
BY
[signature]
ATTORNEY United States Patent Office 2,976,368

Patented Mar. 21, 1961

2,976,368

INCOMING TRUNK CIRCUIT FOR IN-DIALING SERVICE

Preston R. Gray, Elmhurst, N.Y., assignor to Bell Telephone Laboratories, Incorporated, New York, N.Y., a corporation of New York Filed Nov. 17, 1958, Ser. No. 774,409

6 Claims. (Cl. 179—27)

This invention relates to telephone systems comprising dial central office and private branch exchange equipment, and more particularly to an incoming trunk circuit for "in-dialing" service.

"In-dialing" service permits direct dialing of a call from an outside point to a desired private branch exchange line without the necessity of directing the call first to the P.B.X attendant who would then extend it to the desired line. It is desirable in connection with such service that the subscriber at a P.B.X line, or station, who has responded to a call be able on occasion to signal his attendant when he wishes to have the call transferred to another line, or to have another party "added in" on the connection.

An object of the present invention, therefore, is to improve in-dialing systems both from the standpoint of the service rendered and from an economic standpoint.

A more specific object of the invention is to permit a connected P.B.X subscriber in an in-dialing system to signal his own attendant by a single operation of his switchhook.

Present day telephone circuits providing special services, such as in-dialing, are apt to be, at best, somewhat complicated. A major factor in the reduction of the cost of such circuits is, of course, a reduction in the number of relays required, obviously without accompanying reduction in service provided.

In accordance with a particular feature of the present invention a reduction in the number of relays that would otherwise be required is attained through a novel "triple function" thermistor circuit.

In accordance with another feature of the invention, also effective in reducing the number of relays required, the operating and locking circuits of a number of relays are completed to a common ground, already provided under certain circuit conditions, at the incoming P.B.X switch train circuit.

In accordance with a still further feature of the invention a novel arrangement is provided for battery supply to a connected P.B.X station.

A full understanding of the arrangement contemplated by the present invention as well as an appreciation of the various advantageous features may be gained from a consideration of the following detailed description in connection with the accompanying drawing.

Referring now to the drawing there is shown an incoming trunk circuit adapted to interconnect the outgoing trunk circuit at the remote or main dial office to the incoming P.B.X switch circuit and thence through to the called P.B.X line. As will be described in detail subsequently, novel arrangements are included whereby a called, and connected, P.B.X subscriber may signal the P.B.X attendant by a momentary flash of his switchhook in order to have the call transferred to another line or to have an additional line added-in to establish a three-way connection between the calling central office subscriber and the two P.B.X stations. In instances where after a connection has been established between the calling party and the primary called P.B.X subscriber it is found that the call should be handled by a different or secondary party at the P.B.X, or that another party should be added, it is desirable of course that the primary P.B.X subscriber be able to signal his attendant to have the transfer made, thereby eliminating the necessity of the calling subscriber redialing.

*Seizure of outgoing trunk circuit and dialing the desired P.B.X station*

Assuming that subscriber A at the remote central office (not shown) desires to call subscriber B at the P.B.X, he will in accordance with the in-dialing service dial directly the number assigned to subscriber B. Dialing of the called office code will cause seizure of the outgoing trunk circuit at the central office connected to the incoming trunk circuit which is illustrated, and a bridge is thereupon connected across tip lead 11 and ring lead 12 at the central office. Connection of this bridge results in operation of relay 13 over a circuit traced from battery through upper winding of the relay, normally made No. 2 contacts of relay 14, normally made No. 2 contacts of relay 16 to ring lead 12, over the bridge (not shown), tip lead 11, normally made No. 1 contacts of relay 16, normally made No. 1 contacts of relay 14, through lower winding of relay 13, to ground.

Operation of relay 13 completes a path through its No. 3 contacts, which connects a bridge consisting of the upper winding of relay 16 and resistor 17 in series, across the tip and ring leads 21 and 28, respectively, at incoming P.B.X switch train circuit 18. The path referred to may be traced from tip lead 21, No. 3 contacts of relay 22, lead 23, No. 3 contacts of relay 13, No. 1 normally made contacts of relay 24, lead 26, resistor 17, upper winding of relay 16, No. 2 normally made contacts of relay 24, lead 27, No. 4 contacts of relay 22, to ring lead 28. The incoming P.B.X switch circuit 18 may be one of several connector circuits well known in the art of the type which reverses battery over this path when the called station (subscriber B) answers.

Connection of the bridge across leads 21 and 28 of the incoming P.B.X switch circuit 18 causes the circuit to function in the normal manner, and to connect ground to lead 41. This completes an energizing circuit from ground through the normally made No. 5 contacts of relay 22, lead 53, the lower winding of relay 16 to battery. Relay 16 does not operate at this time, however, since the two windings of the relay oppose each other.

As the calling subscriber at the main central office dials the numerical digits of the called P.B.X line, relay 13 follows the dial pulses, releasing at the start of each pulse of each digit. Release of relay 13 causes slow-release relay 24 to operate over a circuit from battery, winding of relay 24, No. 6 contacts of relay 14, No. 7 contacts of relay 22, lead 42, No. 1 break contacts of relay 13, No. 5 normally made contacts of relay 22, to ground on lead 41 at the incoming P.B.X switch circuit. Relay 24 remains operated during the pulses of each digit but releases during the interdigital pauses.

Operation of relay 24 changes the previously described bridge across tip 21 and ring 28 at the incoming P.B.X switch train, which bridge included resistor 17 and the upper winding of relay 16, to a more direct circuit traced from tip lead 21, No. 3 contacts of relay 22, lead 23, No. 3 contacts of relay 13, Nos. 1 and 2 make contacts of relay 24, lead 27, No. 4 contacts of relay 22, to ring lead 28. This more direct bridge across the tip and ring at the incoming P.B.X switch circuit places the pulsing relay in the incoming P.B.X switch train under the direct control of the No. 3 contacts of relay 13, causing said pulsing relay to follow the dial pulses in direct response to the operation and release of relay 13. As the pulsing relay operates, the incoming P.B.X switch is operated to extend the tip and ring leads 21 and 22, respectively, to the terminals of called subscriber B.

As previously stated, relay 24, being slow to release, holds in the operated condition during the dial pulses of each digit and releases during the interdigital pause. The inclusion of resistor 43 in the circuit together with the sequence of the contacts of relay 24, prevent the transmission of a false pulse on the release of relay 24 during the interdigital pause.

*Called P.B.X station answers*

Assuming now that the called P.B.X primary subscriber B answers the call, the polarity of the battery and ground connected to tip 21 and ring 28, respectively, will be reversed by the selector or connector of the incoming P.B.X switch train circuit and relay 16 will operate since its two windings now aid each other.

At its Nos. 1 and 2 make contacts, operated relay 16 reverses the connection through the windings of relay 13 of battery and ground to tip lead 11 and ring lead 12 to the remote central office. This causes the "called party answer" indication at the central office in the well-known manner.

Operation of relay 16 also establishes an energizing circuit for relay 14, traced from battery, resistor 44, winding of relay 14, No. 3 make contacts of relay 16, thermistor 46, normally made No. 5 contacts of relay 22, to ground on lead 41. Relay 14 does not operate at once, however, due to the inclusion of thermistor 46 (a resistor of a type well known in the art having a large negative temperature coefficient) as a series element in the operating circuit. As thermistor 46 is heated by the passage of current therethrough, its resistance will gradually decrease until sufficient current flows in the path described above to cause the operation of relay 14. The characteristics of the thermistor are selected to give the required delay interval, which may be, for example, of the order of five seconds. The purpose of this delay will be described subsequently.

Several circuit changes result from the operation of relay 14. First, the operating circuit of relay 24 is interrupted at the No. 6 contacts of relay 14, causing relay 24 to release. Second, the operating circuit of relays 51 and 52, which will be completely described subsequently, is partially established at the No. 7 contacts of relay 14. Third, a path is set up to hold relay 14 operated, which shorts thermistor 46, this holding circuit being traced from battery, resistor 44, winding of relay 14, No. 5 contacts of relay 14, lead 53, No. 5 normally made contacts of relay 22, to ground on sleeve lead 41; relay 14 is held operated over this circuit while thermistor 46, being shorted out of the circuit, is permitted to cool. Fourth, battery and ground are connected through the windings of relay 13 to tip lead 11 and ring lead 12, respectively, through the No. 2 and No. 1 make contacts, respectively, of relay 14, this connection being independent of contacts of relay 16 previously involved in the connection.

The purpose of the delay introduced in the operation of relay 14 through the action of thermistor 46 previously referred to is to prevent false operation of relays 51 and 52 if the called subscriber B should momentarily "fumble" the handset when answering the call thus simulating a momentary "disconnect," by the momentary release of relay 16. The first function of thermistor 46, therefore, is to obtain slow operation of relay 14.

*Disconnect without signaling P.B.X attendant*

Assuming that P.B.X subscriber B disconnects first, battery and ground connected to tip lead 21 and ring lead 28, respectively, are reversed by the P.B.X switch train circuit 18, and relay 16 releases since its windings now again oppose each other.

The release of relay 16 causes two circuit changes. First, an operating path for relay 51 is completed which is traced from battery, resistor 55, winding of relay 51, No. 2 normally made contacts of relay 51, No. 7 contacts of relay 14, No. 1 contacts of relay 52, No. 4 contacts of relay 16, No. 5 normally made contacts of relay 22, to ground on sleeve lead 41. Relay 51 operates but performs no function at this point. The ground which operates relay 51 is applied over the No. 2 back contacts of relay 52 to the right terminal of said latter relay, the ground on its left terminal being the operating ground for relay 51 while said relay is normal. Second, release of relay 16 establishes a path from battery, resistor 44, No. 3 make contacts of relay 14, No. 1 back contacts of relay 54, No. 3 back contacts of relay 16, thermistor 46, lead 53, No. 5 normally made contacts of relay 22, to ground on lead 41. Thermistor 46, being initially in "cool" condition, offers relatively high resistance to current flow. However, as the thermistor heats up the current flow over this path gradually increases until the drain is such that sufficient current no longer passes through the winding of relay 14 to hold the relay operated and it releases.

This delay in the release of relay 14 is provided in order to prevent the transmission of a false "disconnect" indication to the central office, as subsequently described, in the event the P.B.X connected subscriber "flashes" his switchhook momentarily in error. Providing for the slow-release of relay 14 comprises the second function of thermistor 46, the first function, as described above, being to provide for slow-operate of the same relay.

When relay 14 releases, it again reverses the connection of battery and ground, through the windings of relay 13, to tip 11 and ring 12 causing "called party disconnect" indication at the central office. Release of relay 14 also interrupts, at its No. 4 contacts the locking circuit of relay 51, which releases.

When the calling party A disconnects, the bridge connected across tip 11 and ring 12 in the outgoing trunk circuit at the central office is opened, releasing relay 13. Release of relay 13 opens the bridge across tip 21 and ring 28, through the upper winding of relay 16, thus restoring the incoming P.B.X switch train circuit 18 to normal, removing ground from lead 41.

*Calling party disconnects first*

In the event calling party A disconnects first, the bridge connected to tip 11 and ring 12 in the outgoing trunk circuit at the central office is opened and relay 13 is released. As above stated, release of relay 13 results in restoring switch train circuit 18 to normal and the consequent removal of ground from lead 41. This causes release of relays 16 and 14 and the restoration of the circuit to normal condition.

*Called P.B.X subscriber B signals P.B.X attendant*

Assuming now that subscriber B, after answering the incoming call, finds it desirable to have the call transferred to another subscriber at the P.B.X or to have another subscriber "added in" on the connection, he signals his P.B.X attendant by momentarily depressing or flashing his switchhook. This momentary depression of the switchhook causes a reversal by the selector of P.B.X switch circuit 18 of the battery and ground connected to tip 21 and ring lead 28, which, in turn, causes relay 16 to release and immediately reoperate.

It will be recalled from previous description that relay 14 is operated at this point so that, as relay 16 releases, relay 51 operates over a previously described circuit and relay 52 is held shorted.

However, when relay 16 reoperates, relay 52 will operate since the short circuit is removed; the operating path for relay 52 being traced from battery, winding of relay 52, No. 2 make contacts of relay 51, No. 4 contacts of relay 14, lead 53, to aforetraced ground on lead 41. The operation of relay 52 prevents the further action of relays 51 and 52 at this time upon possible inadvertent additional "flashes" of the switchhook by P.B.X subscriber B.

The delaying action of thermistor 46, described above, prevents the release of relay 14 when the release of relay 16 is only momentary, thus maintaining the answer supervision to the central office at this time.

The operation of relays 51 and 52 results, first, in operation of relay 22 over a circuit traced from battery, winding of relay 22, No. 6 contacts of relays 51 and 52, lead 56, No. 1 front contacts of relay 13, to aforetraced ground on lead 41. Second, operation of relays 51 and 52 completes a circuit for lighting lamp 57, traced from battery through lamp 57, No. 2 back contacts of relay 54, No. 5 contacts of relays 51 and 52, to ground. Lamp 57 is associated with jack 58 at the P.B.X switchboard and serves to signal the P.B.X attendant. Third, operation of the relays 51 and 52 sets up at the respective Nos. 3 and 4 contacts thereof, and including leads 23 and 27 respectively, supplementary paths to tip 21 and ring 28 from tip 11 and ring 12.

Operation of relay 22 transfers the common holding circuits previously traced from the ground on lead 41 to direct ground on its No. 5 make contacts, and connects incoming tip 11 and ring 12 leads through the Nos. 1 and 2 contacts, respectively of relay 22 to tip lead 71 and ring lead 72, capacitors 73 and 74 being included in the last two respective leads.

*P.B.X attendant responds*

The P.B.X attendant responds to the lighting of lamp 57 by inserting plug 76 of a cord into jack 58 as though answering an incoming central office call; the attendant's telephone set is connected across the tip and ring of the cord by operation of key 77. Insertion of plug 76 in jack 58 completes a circuit from battery, upper winding of relay 54 to ground on the sleeve of plug 76; relay 54 operates over this circuit and opens the energizing path of lamp 57 which is extinguished. Relay 54, upon operation, locks up over its lower winding and No. 2 make contact, and No. 5 contacts of relays 51 and 52 to ground, and prepares at its No. 1 make contacts the circuit for the further functioning of relays 51 and 52 under control of relays 16.

The connection of battery through the upper winding of relay 54 to the sleeve of jack 58 and the connection of battery and ground respectively through the windings of retardation coil 78 to the ring and tip respectively of jack 58, cause this circuit to appear as a central office trunk to the P.B.X switchboard cord circuit. The P.B.X attendant now requests the necessary information from P.B.X subscriber B over the following talking circuit; from the tip side of the telephone set, tip of cord and jack, lead 71, capacitor 73, No. 1 contacts of relay 22, capacitor 83, No. 3 contacts of relay 13, lead 23, No. 3 contacts of relays 51 and 52, tip lead 21, over the tip of the switch train and B subscriber's loop, ring of the switch train, ring lead 28, No. 4 contacts of relays 52 and 51, lead 27, No. 2 contacts of relay 13, capacitor 84, No. 2 contacts of relay 22, capacitor 74, lead 72, ring of jack and cord to the operator's telephone set. The P.B.X operator then completes the connection to the additional P.B.X subscriber C in the same manner as for a call from a central office trunk to a P.B.X station, plug 81 of the seized cord circuit being inserted in jack 82 of P.B.X secondary subscriber C.

A capacitor coupled talking path through capacitors 83, 73, 84 and 74 is now established between calling subscriber A at the central office and subscribers B and C at the P.B.X. It is noted, also, that transmitter battery for the added station C is supplied through the windings of retardation coil 78 over tip 71 and ring 72 to the cord circuit and thence to the subscriber's set.

*Disconnect after transfer to P.B.X attendant*

Assuming first that primary subscriber B, after having the incoming call directed to secondary subscriber C, disconnects. When subscriber B disconnects, the polarity of the battery and ground connected to tip and ring leads 21 and 28 is reversed by the selector of switch train 18 and relay 16 releases.

Relay 16, upon releasing, sets up a circuit through thermistor 46 for causing a delayed release of relay 51 in a manner generally similar to that previously described in connection with the delayed-release circuit affecting relay 14. The circuit referred to is traced from battery at relay 51, resistor 55, No. 2 make contacts of relay 52, No. 7 contacts of relay 14, No. 1 contacts of relay 51, No. 1 make contacts of relay 54, No. 3 back contacts of relay 16, through thermistor 46, lead 53, to ground on the No. 5 make contacts of relay 22. Since thermistor 46 has cooled and initially presents a high resistance, sufficient current will not traverse this path to affect the circuit and relay 51 will remain operated over its previously traced operating path. However, as thermistor 46 heats up, its resistance gradually drops until the point is reached when the current drain over the path through thermistor 46 is sufficiently high that the current flow through the operating path is no longer sufficient to hold relay 51 operated and the relay thereupon releases.

A third function of thermistor 46 is, therefore, to obtain a delayed release of relay 51. This delayed release of relay 51 is provided in order to prevent a false and undesired release of the relay should subscriber B inadvertently flash his switchhook after the P.B.X attendant has connected to the trunk circuit.

Release of relay 51 opens, at its No. 2 and No. 3 make contacts the bridge (through the upper winding of relay 16) previously placed across tip 21 and ring 28 of incoming P.B.X switch circuit 18. The P.B.X switching equipment therefore restores to normal, which frees subscribed B for other calls, and also removes ground from lead 41. However, the talking connection between the calling subscriber at the central office and P.B.X subscriber C is maintained since relay 22 is locked over its No. 6 contacts under control of relay 13 to ground on its No. 5 make contacts. Answer supervision to the central office is maintained at this time by operated relay 14.

Now when the calling subscriber A disconnects, the bridge connected across tip 11 and ring 12 by the outgoing trunk at the central office is opened, releasing relay 13. Release of relay 13 results in the release of relay 22. Release of relays 51 and 14 follows the release of relay 22.

Relay 54 remains operated over the path from battery, upper winding of relay 54 to ground on the sleeve of jack 58 until the attendant removes plug 76 from jack 58 in response to the lighted station cord supervisory lamp (not shown). However, the circuit is ready for a new call from the central office as soon as relays 22, 51 and 14 have released. Relay 22 is designed to be slow-to-release, thereby to prevent false restoration at this time on a momentary release of relay 13, such as might result from an inadvertent flashing of the switchhook by the calling subscriber.

If the P.B.X attendant should disconnect from jack 58 in response to disconnect by subscriber C before the calling subscriber A disconnects, relay 54 will release. Release of relay 54 sets up a delayed-release path for relay 14, traced from battery, resistor 44, No. 3 contacts of relay 14, No. 1 back contacts of relay 54, No. 3 back contacts of relay 16, thermistor 46, lead 53 to ground. As previously described above, relay 14 will release over this path after a delay interval determined by the characteristics of thermistor 46. Release of relay 14 causes release of relay 51 and transmits disconnect supervision indication to the central office by reversing the connection of battery and ground, respectively, to tip 11 and ring 12.

Assuming now that calling subscriber A disconnects first, the bridge connected across tip 11 and ring 12 by the outgoing trunk at the central office will be opened and relay 13 will release. Release of relay 13, opens the bridge (through the upper winding of relay 16) across tip 21 and ring 28 and restores incoming P.B.X switch train 18 to normal, and causes release of relay 22 followed by release of relays 52, 16 and 14. Relay 54 remains operated until the attendant removes plug 76 in response to the lighted station cord supervisory lamp (not shown).

If P.B.X subscriber C is the first to disconnect, the P.B.X. attendant will remove plug 76 from jack 58 in response to the lighted station cord supervisory lamp. Relay 54 will remain operated through its lower winding under control of relays 51 and 52 on a path from battery, lower winding of relay 54, No. 5 contacts of relays 51 and 52, to ground. Relay 54 remaining operated, prevents relighting of lamp 57.

The talking connection between the calling subscriber A and P.B.X subscriber B is maintained until either disconnects, whereupon the circuit restores to normal as previously described. Should P.B.X subscriber B disconnect before subscriber A, disconnect supervision is transmitted to the central office on the release of relay 14 as previously described.

After a three-way connection between subscribers A, B and C has been established as previously described, a fourth subscriber can, of course, be substituted for subscriber C by the attendant without disturbing the connection between subscribers A and B. The request for the new connection would be conveyed to the attendant by subscriber C after signaling the attendant by flashing his switchhook, which flashes the station cord supervisory lamp.

The novel manner in which thermistor 46 has been utilized to perform a number of different functions, i.e., to cause the slow operation and slow release of a first relay and the slow release of a second relay, is an important factor in the attainment of the desired features in the described circuit without the necessity of an unduly large number of relays. It will be noted also that the novel manner in which the ground on lead 41 is utilized as a common ground for the operating and locking paths of a plurality of the relays of the circuit is an important contributing factor to the efficiency and economical arrangement of the system.

While certain specific embodiments of the invention have been selected for detailed description, the invention is not, of course, limited in its application to the embodiments described. The embodiments which have been described should be taken as illustrative rather than restrictive thereof.

What is claimed is:

1. In a trunk for automatically connecting a calling line with a called line, a first relay, a second relay, a thermistor, means including said thermistor for operating said first relay, means independent of said thermistor for holding said first relay operated, means including said thermistor for subsequently releasing said first relay, means independent of said thermistor for operating said second relay, and means including said thermistor for releasing said second relay.

2. In a trunk for automatically connecting a calling line with a called line, a first relay, a second relay, a resistor having a large negative temperature coefficient of resistance, means including said resistor for operating said first relay after a time interval, means independent of said resistor for holding said first relay operated, means including said resistor for releasing said first relay after a time interval, means independent of said resistor for operating said second relay, and means including said thermistor for releasing said second relay after a time interval.

3. In a trunk for automatically connecting a calling line with a called line, a circuit arrangement comprising a first relay, a second relay, means for operating said second relay, a resistor having a large negative temperature coefficient of resistance, means effective upon the response of the called subscriber for completing an operating path for said first relay which includes a voltage source and said resistor, means effective upon operation of said first relay for establishing a holding path therefor independent of said resistor, means for establishing a path including said resistor independent of the operating winding of said first relay, said latter path being effective after a time interval to release said first relay, and means for completing an additional path including said resistor independent of the operating winding of said second relay, said additional path being effective after a time interval to release said second relay.

4. In a telephone system, a main exchange and a branch exchange, a trunk line connecting said exchanges and terminating in an automatic switching circuit at said branch exchange, a terminal included in said switching circuit, means for connecting ground to said terminal, a first relay, a second relay and a thermistor at said branch exchange, connections for operating said first relay in circuit with said thermistor and the operating winding of said first relay, for releasing said first relay in circuit with said thermistor and independent of said operating winding, for operating said second relay, and for releasing said second relay in circuit with said thermistor and independent of the operating winding of said second relay, a plurality of other relays at said branch exchange, and means for connecting the operating circuits of a plurality of said relays at said branch exchange to the ground on said terminal.

5. In an automatic telephone system, a main exchange, a branch exchange, a trunk for connecting said exchanges, a subscriber's station and an attendant's position at the branch exchange, means for establishing a connection from said main exchange over said trunk to said subscriber's station at the branch exchange, means for establishing a connection from said subscriber's station to said attendant's position, said last-mentioned means including a first relay and a second relay, a thermistor, a voltage source, means for establishing an operating path for said first relay which includes said voltage source and said thermistor, means effective upon operation of said first relay for establishing a holding path therefor including said voltage source and independent of said thermistor means for establishing a path including said voltage source and said thermistor independent of the operating winding of said first relay, said latter path being effective after a time interval to release said first relay, means for operating said second relay, and means for establishing a path including said thermistor independent of the operating winding of said second relay effective after a time interval to release said second relay.

6. In an automatic telephone system, a main exchange, a branch exchange, a trunk for connecting said exchanges, a first subscriber's station and a second subscriber's station at said branch exchange, an attendant's position at said branch exchange, means for establishing a connection from said main exchange to said first subscriber's station over said trunk, means for establishing a connection from said first subscriber's station to said attendant's position, said last-mentioned means including a first relay, a second relay and a thermistor, means for establishing a delayed operating circuit for said first relay which includes said thermistor, means for establishing a holding circuit for said first relay which is independent of said thermistor, means for establishing a delayed releasing path for said first relay which includes said thermistor, means for establishing an operating circuit for said second relay which is independent of said thermistor, means for establishing a delayed releasing circuit for said second relay which includes said thermistor, and means at said attendant's position for adding said second subscriber's station to the connection between said main exchange and said first subscriber's station.

References Cited in the file of this patent

UNITED STATES PATENTS

| | | |
|---|---|---|
| 2,788,393 | Armstrong | Apr. 9, 1957 |
| 2,841,653 | Pharis | July 1, 1958 |